Figure 1:
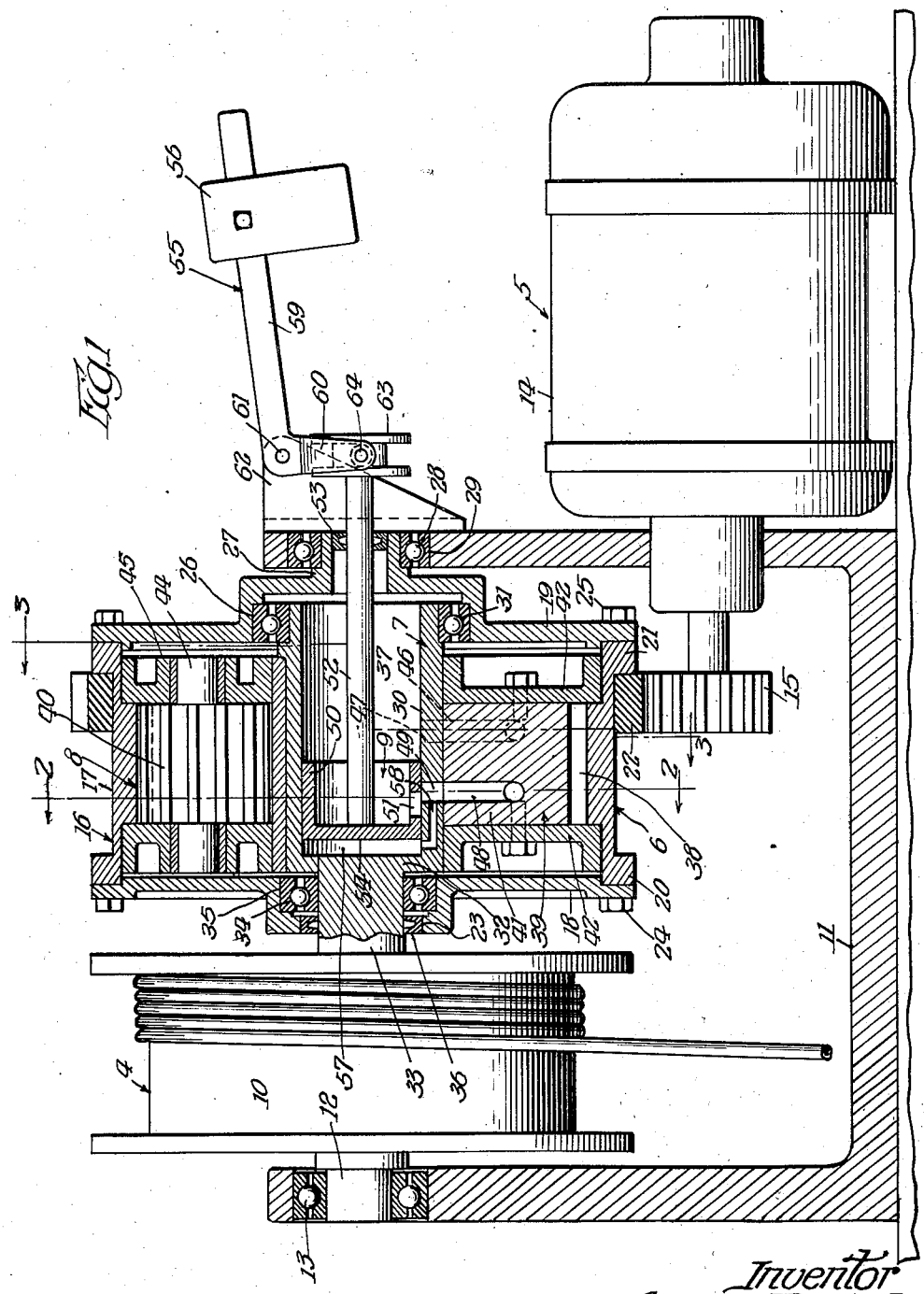

March 5, 1946.  G. E. BOCK  2,396,149
VARIABLE SPEED HYDRAULIC COUPLING
Filed Oct. 29, 1943   2 Sheets-Sheet 1

Inventor
George E. Bock
By Fred Gerlach Atty.

March 5, 1946. G. E. BOCK 2,396,149
VARIABLE SPEED HYDRAULIC COUPLING
Filed Oct. 29, 1943 2 Sheets-Sheet 2

Inventor
George E. Bock

Patented Mar. 5, 1946

2,396,149

UNITED STATES PATENT OFFICE 2,396,149

VARIABLE SPEED HYDRAULIC COUPLING

George E. Bock, Chicago, Ill., assignor to Whiting Corporation, Harvey, Ill., a corporation of Illinois Application October 29, 1943, Serial No. 508,172

8 Claims. (Cl. 192—61)

The present invention relates generally to variable speed hydraulic couplings. More particularly the invention relates to that type of hydraulic coupling which operates as a medium for driving a rotary drum or other member at different speeds (zero to maximum) from a prime mover and as its main or principal parts comprises: (1) a driving element which is connected for drive by the prime mover; (2) a driven element which is connected to the drum; (3) a gear pump variety power transmission mechanism which serves operatively to connect the two elements and embodies a gear connected to one of the elements, a rotary carrier connected to the other element and having arcuate cavities facing and communicating with the gear, planetary pinions mounted in the cavities and in mesh with the gear, means forming inlet ducts between a source of fluid and the suction sides of the pinions, and means forming outlet ducts between the pressure sides of the pinions and said sources; and (4) conjointly operable valves which are associated with, and serve to control the flow of fluid through, the outlet ducts.

When the valves of a variable speed hydraulic coupling of this type are in their fully open position there is no drive of the driven element by the driving element. This is attributable to the fact that there is no restriction to the flow of fluid through the outlet ducts and as a result there is no resistance to rotation of the planetary pinions and the latter rotate freely in their respective cavities and impart no drive to the driven element through the medium of the carrier. When the valves are in their fully closed position no circulation of fluid is permitted through the outlet ducts with the result that the pinions are locked against rotation relatively to the carrier and there is a direct and positive drive of the driven element by the driving element. When the valves are in a partially open position wherein they permit of a limited flow of fluid through the outlet ducts the planetary pinions are permitted to turn at a reduced speed with respect to the carrier and hence the driven element of the coupling is driven at a reduced or differential speed with respect to the driving element. Adjustment of the valves between their open and closed positions determines the speed of drive of the driven element by the driving element.

One object of the invention is to provide a variable speed hydraulic coupling of this type which embodies novel adjustable means for automatically controlling the valves in order to maintain a substantially constant torque so far as the driven element is concerned.

Another object of the invention is to provide a coupling of the last mentioned character in which the automatic control means for the valves is in the form of a piston member which is responsive to variations in the pressure of the fluid in the outlet ducts.

A further object of the invention is to provide a variable speed hydraulic coupling which is generally of new and improved construction, has greater capabilities of use than previously designed couplings and is characterized by high efficiency and simplicity of design.

Other objects of the invention and the various advantages and characteristics of the present hydraulic coupling will be apparent from a consideration of the following detailed description.

The invention consists in the several novel features which are hereinafter set forth and are more particularly defined by claims at the conclusion hereof.

Figure 2:
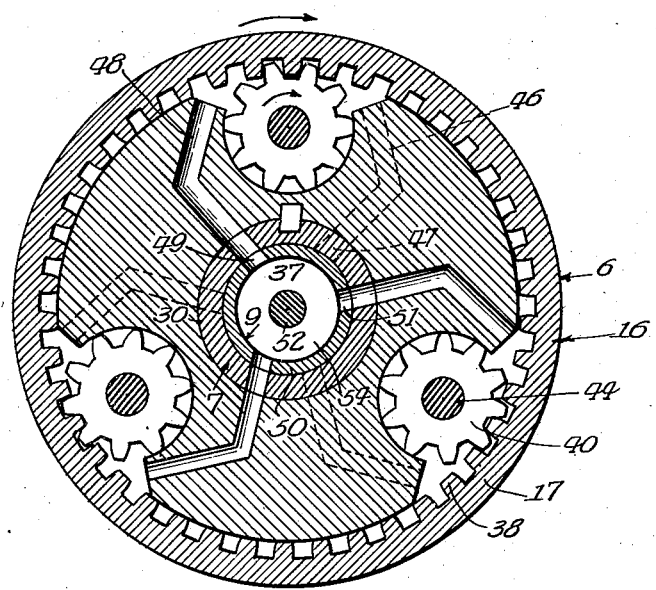
Figure 3:
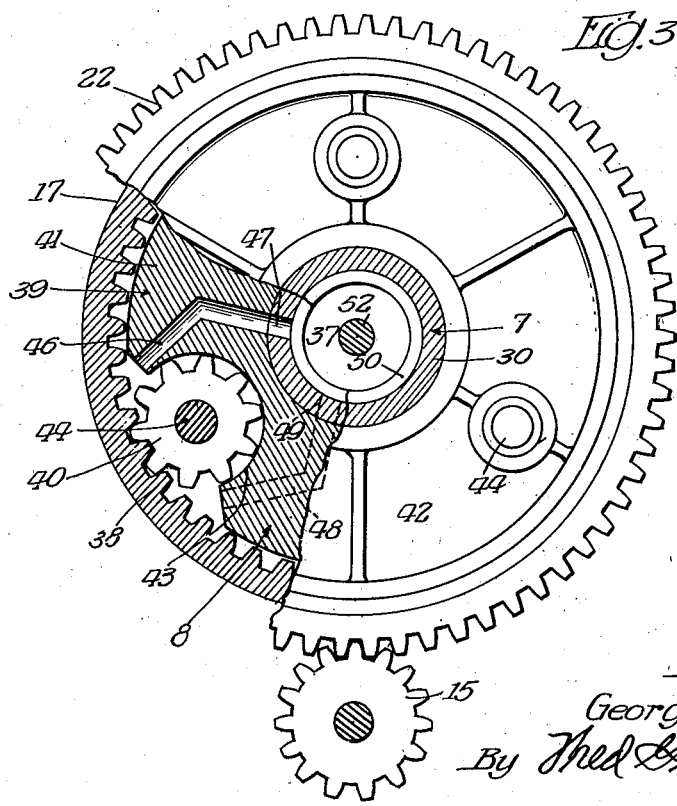

In the drawings which accompany and form a part of this specification or disclosure and in which like numerals of reference denote corresponding parts throughout the several views:

Figure 1 is a longitudinal section of a variable speed hydraulic coupling embodying the invention; and Figures 2 and 3 are vertical transverse sections taken respectively on the lines 2—2 and 3—3 of Figure 1.

The hydraulic coupling which is shown in the drawings constitutes the preferred form or embodiment of the invention. It serves as a medium for driving a rotary member 4 at different speeds from a prime mover 5 and comprises a driving element 6, a driven element 7, a gear pump variety power transmission mechanism 8, a valve structure 9 for controlling the mechanism and means for automatically controlling the valve structure in order to maintain a substantially constant torque so far as the driven element 7 is concerned. For purposes of a clear understanding of the mode of operation of the coupling the rotary member 4 is disclosed as consisting of a hoisting drum 10 having one end of a cable wrapped around and anchored to it. It is contemplated that the other end of the cable will be provided with a device for attachment to a load. When the drum type rotary member 4 is rotated in one direction the cable is wound up with resultant hoisting or raising of the load. Reverse rotation of the drum results in the cable being paid out and the load at the free end of the cable being lowered. The drum member 4 is disposed inwards of one arm of a U-shaped supporting structure 11 and is provided at the end thereof that is adjacent said one arm of the supporting structure with a centrally disposed outwardly extending trunnion 12. The latter fits within, and is keyed or otherwise fixedly secured to, the inner race of a ball bearing 13. The prime mover 5 is in the form of an electric motor 14 which is located outwards of the other arm of the supporting structure 11, as shown in Figure 1. One end of the armature shaft of the motor 14 extends through an opening in said other arm of the supporting structure and is provided with a pinion 15. The electric motor 14 constituting the prime mover, is laterally offset with respect to the drum 10 constituting the rotary member 4 but is arranged however so that the axis of the armature shaft is in parallel relation with the axis of the drum.

The driving element 6 of the coupling is in the form of a cylindrical casing 16 which is located adjacent the inner end of the hoisting drum 10 and is arranged so that its axis is coincident or in alignment with the axis of the hoisting drum. As shown in Figure 1, the casing 16 comprises an annular or ring-shaped outer wall 17 and a pair of end walls 18 and 19. The outer wall 17 is provided at one end thereof with an annular outwardly extending flange 20 and at its other end with an annular outwardly extending flange 21. A ring gear 22 surrounds, and is keyed or otherwise fixedly secured to, the casing outer wall 17 and meshes with the pinion 15. The pinion and ring gear constitute a driving connection whereby the casing 16 is driven by the motor in connection with operation of the latter. The end wall 18 of the casing is positioned directly opposite the inner end of the drum 10 and has a central hole 23. The outer marginal portion of the end wall 18 fits against the annular flange 20 and is removably secured thereto by way of bolts 24. The other end wall of the casing, i. e., the end wall 19, is located immediately inwards of the arm of the supporting structure that has the hole or opening for the pinion carrying end of the armature shaft of the electric motor 14. The outer marginal portion of the end wall 19 fits against the annular flange 20 of the casing outer wall 17 and is removably secured thereto by way of bolts 25. The central portion of the end wall 19 is outwardly offset to provide a cylindrical, inwardly facing recess 26 and embodies an outwardly extending sleeve-like part 27. The latter fits within, and is connected to, the inner race of a ball bearing 28. The outer race of such ball bearing is mounted in a circular hole 29 in the arm of the supporting structure that is adjacent the casing end wall 19. The ball bearing 28 serves rotatably to support the casing 16 constituting the driving element 6 of the coupling. The motor 14, when in operation, is adapted to drive the casing 16 in a clockwise direction as viewed in Figures 2 and 3.

The driven element 7 is disposed in the central portion of the casing 16 and comprises a cylindrical sleeve-like part 30 which is axially aligned with the hoisting drum 10 and has the end thereof that is adjacent the end wall 19 of the casing 16 open. Such end of the sleeve-like part 30 is surrounded and supported by a ball bearing 31, the outer race of which is seated in the cylindrical recess 26. The other end of the sleeve-like part 30 is provided with a cross-wall 32 and this embodies an outwardly extending centrally disposed shaft 33 which extends through the central hole 23 in the end wall 18 of the casing and is connected to the inner end of the hoisting drum 10. As shown in Figure 1 the shaft 33 is surrounded and supported by a ball bearing 34, the outer race of which is disposed in a cylindrical internal recess 35 in the central portion of the casing end wall 18. An oil seal 36 extends around the shaft 33 and fits within the hole defining portion of the casing end wall 18. The interior of the sleeve-like part 30 constitutes a chamber 37 for a body of fluid. The fluid in the chamber is preferably an incompressible liquid, such as oil.

The gear pump variety power transmission mechanism 8 serves operatively to connect the driven element 7 with the driving element 6. It is under control of the valve structure 9 and embodies a ring gear 38 with internal teeth, a rotary carrier 39, and a plurality of planetary pinions 40. The ring gear 38 is formed as an integral part of the central portion of the cylindrical outer wall 17 of the casing 16 and hence is driven in connection with drive of the element 6 by the electric motor 14. The rotary carrier 39 is disposed in the casing 16 midway between the casing end walls 18 and 19. It surrounds and is keyed or otherwise fixedly connected to the cylindrical sleeve-like part 30 of the driven element 7 and consists of an intermediate ring-shaped body 41 and a pair of end heads 42. The body is surrounded by the ring gear 38 and embodies in the outer portion thereof a plurality of equidistantly spaced arcuate cavities 43. The latter correspond in number to the planetary pinions 40 and face in the direction of, and open onto, the ring gear 38. As illustrated in the drawings the cavities 43 extend to and through the end faces of the intermediate body 41. The end heads 42 of the rotary carrier 39 fit against the end faces of the intermediate body 41. They are bolted to the body and serve as closures for the ends of the arcuate cavities 43. The planetary pinions 40 are mounted for the most part in the cavities 43 and have the outer portions thereof in mesh with the ring gear 38. They are rotatably supported by way of shafts 44 which extend through the central portions of the pinions and have the ends thereof journalled in bearings 45 in the end heads 42 of the rotary carrier 39. The carrier is adapted, as hereinafter described, to be driven by the casing 16 constituting the driving element 6 and when driven by the casing rotates in the same direction as the casing, i. e., in a clockwise direction as illustrated in Figure 2. The leading portions of the arcuate cavities 43 are connected to receive fluid from the chamber 37 in the sleeve-like part 30 of the driving element 7 by way of inlet ducts 46. These ducts, with the exception of their inlet ends, are formed in the intermediate body 41 of the rotary carrier 39. The inlet ends of the ducts 46 are in the form of holes 47 and these are formed in the sleeve-like part 30 of the driving element 7 and are at all times open. The trailing portions of the arcuate cavities communicate with the chamber 37 by way of outlet ducts 48. The latter, with the exception of their discharge ends, are formed in the intermediate body 41. The discharge ends of the outlet ducts 48 are in the form of holes 49 in the sleeve-like part 30 of the driven element 7. As shown in Figure 1, the inlet and outlet ducts are offset with respect to the axis of the rotary carrier 39. When the casing 16 is driven by the electric motor 14 while there is no restriction of the outlet ducts 48 the ring gear 38 serves to drive or rotate the planetary pinions 40 relatively to the rotary carrier 39. The pinions, during drive thereof, serve as pumping means and cause fluid to flow from the chamber 37 through the inlet ducts 46 and thence back to the chamber by way of the outlet ducts 48. The pumping action is attributable to the fact that the teeth of the planetary pinions create suction as they emerge from engagement with the teeth of the ring gear 38 and such suction results in the flow of fluid to the leading sides of the cavities 43 via the inlet ducts 46. The fluid that is drawn to the leading portions of the cavities flows into the spaces between the teeth of the planetary pinions and thence revolves around the cavities until the teeth of the pinions again enter into engagement with the teeth of the ring gear. When the teeth of the pinions enter into engagement with the teeth of the ring gear the fluid which is carried in the spaces between the pinion teeth is forced back to the chamber 37 via the outlet ducts 48. When the outlet ducts are fully open or unrestricted there is a free pumping of the fluid by the planetary pinions with the result that such pinions revolve or rotate without resistance and the carrier 39 and the driven element 7 remain stationary. When, however, the outlet ducts 48 are closed by the valve structure 9, as hereinafter described, pressure builds up on the pressure sides of the planetary pinions, i. e., the pinion sides that are adjacent the inlet ends of the outlet ducts and results in the pinions being held or locked against rotation relatively to the carrier 39. In the event that the pinions are locked against rotation relatively to the carrier as a result of closing of the outlet ducts, the carrier 39 is positively driven by the ring gear 38 and hence there is a conjoint and positive drive of the driven element 7 by the driving element 6. When the outlet ducts 48 are partially open wherein they permit of a limited flow of fluid therethrough the planetary pinions 40 are permitted to turn or rotate at a reduced speed relatively to the carrier and hence the driven element of the clutch is driven at a reduced or differential speed with respect to the driving element 6.

The valve structure 9 serves to control the outlet ducts 48. It consists of a sleeve 50 which is slidably mounted in the sleeve-like part 30 of the driven element 7 and embodies through ports 51. The latter correspond in number to the holes 49 constituting the discharge ends of the outlet ducts 48 and are adapted when the sleeve 50 is slid into a predetermined position with respect to the sleeve-like part 30 of the driven element 7 to register with said holes 49. When the ports 51 are in registry with the holes 49 a free flow of fluid is permitted through the outlet ducts 48 and the coupling is in its so-called neutral position wherein the driven element 7 remains stationary. When the sleeve 50 of the valve structure 9 is shifted towards the crosswall 32 of the driven element 7 to such an extent as to bring the through ports 51 wholly out of registry with the holes 49 the outlet ducts 48 are closed against the flow of fluid therethrough with the result that a direct driving connection is established between the carrier 39 and the ring gear 38 and the driven element 7 in connection with drive of the coupling is driven conjointly with, that is, at the same speed as, the driving element 6. When the sleeve 50 is shifted to a less extent in the direction of the crosswall 32 so as to cause the ports 51 but partially to register with the holes 49 flow of fluid through the outlet ducts is restricted with the result that the back pressure against the pressure sides of the pinions creates such resistance that the pinions rotate at reduced speed with respect to the carrier and the driven element is driven at a reduced speed by the driving element. From the foregoing it is manifest that adjustment of the sleeve 50 determines the speed of drive of the driven element 7 by the driving element 6. Shift of the sleeve 50 constituting the valve structure 9 for speed controlling purposes is effected by way of a rod 52. This rod is centrally positioned with respect to the sleeve-like part 30 of the driven element 7 and has one end thereof operatively connected to the sleeve 50. The other end of the rod extends through the sleeve-like part 27 on the central portion of the side wall 19 and has the extremity thereof exteriorly disposed so far as the casing 16 is concerned. A sealing ring 53 extends between said other end of the rod 52 and the sleeve-like part 27 and permits longitudinal sliding movement of the rod while at the same time preventing leakage of fluid from the chamber 37 through said sleeve-like part 27.

The means for automatically controlling the valve structure 9 in order to maintain a substantially constant torque so far as the driven element 7 is concerned, comprises a piston 54 a bell crank 55 and a counter-weight 56. The piston 54 is slidably mounted in the sleeve-like part 30 of the driven element 7 and is disposed adjacent, but in spaced relation with, the crosswall 32 of the driven element. The central portion of the piston is connected to the inner end of the control rod 52 and the marginal portion is connected to the adjacent end of the sleeve 50 of the valve structure 9. The space between the piston 54 and the crosswall 32 constitutes a pressure chamber 57 and is in communication with one of the outlet ducts 48 by way of a bleed duct 58. The latter is formed in the sleeve-like part 30 of the driven element 7 and leads to one of the holes 49. By reason of the fact that the pressure chamber 57 is in communication with one of the outlet ducts the pressure of the fluid in the chamber 57 is the same as that in the outlet ducts 48 and the same as on the pressure sides of the pinions 40, and the piston is subject to pressure variations. The pressure in the chamber is determined by the relative speed of rotation between the pinions and the ring gear 38, by the density of the fluid pumped, and by the degree of restriction of the outlet ducts resulting from the relative position of the ports 51 in the sleeve 50 and the holes 49 in the sleeve-like part 30. Such pressure that is developed on the pressure sides of the pinions acting upon the projected area of the ring gear produces the force that is transmitted from the driving element to the driven element. This force acting at a certain radius measured from the center of rotation of the coupling therefor constitutes the transmitted torque. Inasmuch as the physical dimensions of the parts are fixed the transmitted torque is, therefore, directly proportional to the pressure that is produced on the pressure sides of the pinions. Such pressure can be maintained constant by varying the restriction of the outlet ducts to compensate for any change in the rate of fluid pumping and the density of the fluid. The restriction of the outlet ducts is varied by the relative movement of the valve structure 9. This relative movement of the valve structure is operatively connected to the movement of the piston and, therefore, any change in the pressure of the fluid in the pressure chamber 57 that would cause the piston to move against the external resisting force of the counter-weight will change the restriction to the outflow from the pump elements. This balance will prevail at all times under all changes of speed and fluid density but this relation can be varied by changing the external force acting on the piston, in this case by moving the counter-weight. The bell crank 55 is located adjacent the electric motor 14 and comprises a substantially horizontal arm 59 and a depending arm 60. It is mounted to swing in a vertical plane by way of a pivot pin 61. which extends through the elbow part of the bell crank and is mounted in a bracket 62 on the arm of the supporting structure 9 that carries the ball bearing 28. The arm 60 is bifurcated and straddles a circumferentially grooved collar 63 on the outer end of the rod 52. The outer extremities of the two parts of the arm 60 are provided with inwardly extending pins 64 which project into the circumferential groove in the collar 63. When the bell crank 55 is swung in a counterclockwise direction as viewed in Figure 1, the valve structure 9 is moved away from the crosswall 32 of the driving element 7 with the result that the through ports 51 of the sleeve 50 of the valve structure move into registry with the holes 49 constituting the outlet ends of the outlet ducts 48. When the bell crank 55 is swung in the opposite direction, i. e., in a clockwise direction as viewed in Figure 1, the valve structure 9 is slid towards the crosswall 32 with the result that the through ports 51 move out of registry with the holes 50. The counter-weight 56 is mounted on the arm 59 of the bell crank 55 so that it is adjustable longitudinally or lengthwise thereof. A set screw (see Figure 1) serves releasably to lock the counter-weight in its various adjusted positions. The counter-weight 56 operates through the medium of the bell crank 55 and the rod 52 to urge the piston 54 together with the valve structure 9 towards the crosswall 32 of the driven element 7. Such control movement on the part of the counter-weight is counteracted during operation of the coupling by the pressure of the fluid in the pressure chamber 57. The counter-weight and the piston coact automatically to control the valve structure 9 so as to maintain a substantially constant torque so far as the driven element 7 is concerned. By adjusting the counter-weight 56 on the arm 59 of the bell crank the coupling may be set to provide any desired substantially constant torque of the driven element 7. When the clutch is set to maintain a predetermined constant torque of the driven element and there is an increase in the pressure of the exhaust fluid for any reason whatsoever, such, for example, as may occur in connection with increased rotational speed of the driving element 6, the piston 54, due to the pressure increase in the chamber 57, moves away from the crosswall 32 and effects increased opening of the valve structure 9. Such increased opening of the valve structure results in less resistance to the pumping action of the planetary pinions and resultant diminution in the speed of drive of the driven element 7. Should, in connection with a predetermined setting of the counter-weight 56, the pressure of the fluid in the pressure chamber 57 decrease due to reduced drive of the driving element 6, or any other reason, the piston 54, due to the action of the counter-weight, moves towards the crosswall 32 and effects additional partial closing of the valve structure 9. Such additional partial closing on the part of the valve structure results in a decrease in flow of fluid through the outlet ducts and this in turn builds up resistance on the pressure sides of the pinions and increases drive of the driven member 7. Because of the automatic control of the valve structure 9 by the piston 57 which is responsive to variations in the pressure of the fluid in the discharge ducts the torque of the driven element will be substantially constant. If an increased torque is desired the counter-weight 56 is shifted outwards on the arm 59 of the bell crank 55. To effect a decrease in the torque of the driven element 7 the counter-weight 56 is inwardly adjusted with respect to the bell crank arm 59. By adjusting the position of the counter-weight the coupling, as previously pointed out, may be set to maintain any desired substantially constant torque so far as the driven element 7 is concerned. If desired, the coupling may be so set that the torque of the driven element corresponds to the load on the hoisting drum 10. When the coupling is so set the load will remain stationary at any elevation and may, if desired, be manually raised or lowered and will remain in the position into which it is manually shifted or adjusted.

When the electric motor 14 is in operation, the cable of the hoisting drum 10 is connected to a load, and the coupling is so set that the torque of the driven element 7 as controlled by the pressure responsive piston 54 corresponds to the load, no displacement of the load takes place. Should it be desired to elevate the load the operator manually depresses or swings the arm 59 of the bell crank lever 55. This results in closing of the valve structure 9 and driving of the hoisting drum so as to elevate the load. When the load is at the desired elevation the operator releases the bell crank 55 with the result that the piston 54 is brought into play and so automatically controls the valve structure 9 as to maintain the load against further upward or downward movement. In the event that the operator desires to lower the load the arm 59 of the bell crank 55 is swung upwards so as to open the valve structure 9. When the valve structure is opened in response to upward swing of the arm 59 the torque of the driven element 7 so decreases in magnitude that it fails to counterbalance the load and the latter moves downwards. The speed of downward movement of the load is determined by the amount of upward swing of the bell crank arm 59. Likewise the speed of upward movement of the load is determined by the amount of downward swing of the bell crank arm 59 by the operator. Whenever the bell crank is released movement of the load ceases, provided, however, that the coupling is set so that the torque of the driven element 7 corresponds to the weight of the load.

The herein described coupling is highly efficient in operation because it includes automatic means for maintaining any desired torque of the driven element 7. Because such means is essentially simple the coupling as a whole may be produced at a low cost.

Whereas the coupling has been described as being driven by an electric motor and for use in driving a hoisting drum it is to be understood that it may be driven by any other form of prime mover and has many other capabilities of use. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A hydraulic coupling comprising a power driven driving element; a driven element; a gear pump power transmission mechanism arranged operatively to connect the two elements, having a fluid containing chamber associated therewith, and embodying a gear connected to one of the elements, a rotary carrier connected to the other element and having a cavity facing the gear, a planetary pinion mounted in the cavity and meshing with said gear, means forming an inlet duct between the chamber and the suction side of the pinion, and means forming an outlet duct between the pressure side of said pinion and said chamber; a valve for controlling the flow of fluid through the outlet duct; and mechanism operative automatically during operation of the coupling to actuate the valve so as to maintain a substantially constant transmitted torque so far as the driven element is concerned, and embodying a slidably mounted piston operatively connected to the valve, means forming a bleed duct between the outlet duct and one side of the piston whereby the piston is subjected to variations in the static pressure of the fluid in said outlet duct, and means for subjecting the piston to a substantially constant force in opposition to the pressure against the piston resulting from the bleed duct.

2. A hydraulic coupling comprising a power driven driving element; a driven element; a gear pump power transmission mechanism arranged operatively to connect the two elements, having a fluid containing chamber associated therewith, and embodying a gear connected to one of the elements, a rotary carrier connected to the other element and having a cavity facing the gear, a planetary pinion mounted in the cavity and meshing with said gear, means forming an inlet duct between the chamber and the suction side of the pinion, and means forming an outlet duct between the pressure side of said pinion and said chamber; a valve for controlling the flow of fluid through the outlet duct; and mechanism operative automatically during operation of the coupling to actuate the valve so as to maintain a substantially constant transmitted torque so far as the driven element is concerned and embodying a slidably mounted piston operatively connected to the valve, means establishing communication between the outlet duct and one side of the piston whereby the piston is subjected to variations in the static pressure of the fluid in said outlet duct, and means for subjecting the piston to a substantially constant force in opposition to the pressure against the piston, said last mentioned means being adjustable while the coupling is in operation in order to vary the force against the piston and resultantly vary the substantially constant transmitted torque.

3. A hydraulic coupling comprising a power driven driving element; a driven element; a gear pump power transmission mechanism arranged operatively to connect the two elements, having a fluid containing chamber associated therewith, and embodying a gear connected to one of the elements, a rotary carrier connected to the other element and having a cavity facing the gear, a planetary pinion mounted in the cavity and meshing with said gear, means forming an inlet duct between the chamber and the suction side of the pinion, and means forming an outlet duct between the pressure side of said pinion and said chamber; a valve for controlling the flow of fluid through the outlet duct; and mechanism operative automatically during operation of the coupling to actuate the valve so as to maintain a substantially constant transmitted torque so far as the driven element is concerned and embodying a slidably mounted piston, means forming a bleed duct between the outlet duct and one side of the piston whereby the piston is subjected to variations in the static pressure of the fluid in said outlet duct, and means for subjecting the other side of the piston to a substantially constant force.

4. A hydraulic coupling comprising a rotatably mounted cylindrical casing provided with driving means therefor and adapted to contain fluid; a driven element; a gear pump variety power transmission mechanism in the casing arranged operatively to connect the casing and element and embodying a ring gear connected to the inner periphery of the outer wall of the casing, a plurality of spaced apart planetary pinions meshing with the gear, and a rotary carrier connected to drive the element, provided at the outer margin thereof with pinion retaining cavities facing the gear, and having inlet ducts for the fluid between the casing interior and the suction sides of the pinions and outlet ducts for the fluid between the pressure sides of the pinions and the casing interior; valve means for controlling the outlet ducts, mechanism operative automatically during operation of the coupling to actuate the valve means so as to maintain a substantially constant transmitted torque so far as the driven element is concerned, and embodying a slidably mounted piston operatively connected to the valve means, means forming a bleed duct between one of the outlet ducts and one side of the piston whereby the piston is subjected to variations in the static pressure of the fluid in said one outlet duct, and means for subjecting the piston to a substantially constant force in opposition to the pressure against the piston resulting from the bleed duct.

5. A hydraulic coupling comprising a rotatably mounted cylindrical casing provided with driving means therefor and adapted to contain fluid; a driven element; a gear pump variety power transmission mechanism in the casing arranged operatively to connect the casing and element and embodying a ring gear connected to the inner periphery of the outer wall of the casing, a planetary pinion meshing with the gear, and a rotary carrier in the casing connected to drive the element, provided at the outer margin thereof with a pinion retaining cavity facing the gear, and having an inlet duct between the casing interior and the suction side of the pinion and an outlet duct between the pressure side of the pinion and the casing interior; a valve for controlling the outlet duct; and automatic means in the casing operative in response to variation in the static pressure of the fluid in the outlet duct so as to actuate the valve as to maintain a substantially uniform pressure at the pressure side of the pinion at all times during operation of the coupling and thus effect a substantially constant transmitted torque so far as the driven element is concerned, said automatic means being adjustable from outside of the casing and while the coupling is in operation in order to vary the magnitude of said transmitted torque.

6. A hydraulic coupling comprising a rotatably mounted cylindrical casing provided with driving means therefor and adapted to contain fluid; a driven element; a gear pump variety power transmission mechanism in the casing arranged operatively to connect the casing and element and embodying a ring gear connected to the inner periphery of the outer wall of the casing, a planetary pinion meshing with the gear, and a rotary carrier in the casing connected to drive the element, provided at the outer margin thereof with a pinion retaining cavity facing the gear, and having an inlet duct between the casing interior and the suction side of the pinion and an outlet duct between the pressure side of the pinion and the casing interior; a valve for controlling the outlet duct; and mechanism operative automatically during operation of the clutch to actuate the valve so as to maintain a substantially constant transmitted torque so far as the driven element is concerned and embodying a slidably mounted piston operatively connected to the valve, means establishing communication between the outlet duct and one side of the piston whereby the piston is subjected to variations in the static pressure of the fluid in said outlet duct, and means for subjecting the piston to a substantially constant force in opposition to the pressure against the piston, said last mentioned means being adjustable from the outside of the casing and while the coupling is in operation in order to vary the force against the piston and resultantly vary the magnitude of the transmitted torque.

7. A hydraulic coupling comprising a rotatably mounted cylindrical casing provided with driving means therefor and adapted to contain fluid; a driven element; a gear pump variety power transmission mechanism in the casing arranged operatively to connect the casing and element and embodying a ring gear connected to the inner periphery of the outer wall of the casing, a planetary pinion meshing with the gear, and a rotary carrier in the casing connected to drive the element, provided at the outer margin thereof with a pinion retaining cavity facing the gear, and having an inlet duct between the casing interior and the suction side of the pinion, and an outlet duct between the pressure side of the pinion and the casing interior; a valve for controlling the outlet duct; and mechanism operative automatically during operation of the clutch to actuate the valve so as to maintain a substantially constant transmitted torque so far as the driven element is concerned and embodying a slidably mounted piston operatively connected to the valve, means establishing communication between the outlet duct and one side of the piston whereby the piston is subjected to variations in the static pressure of the fluid in said outlet duct, and means for subjecting the piston to a substantially constant force in opposition to the pressure against the piston, embodying a bell crank positioned exteriorly of the casing and having one arm thereof operatively connected to the piston and its other arm provided with a weight, said weight being mounted for adjustment lengthwise of said other arm of the bell crank in order to vary the force against the piston and resultantly vary the magnitude of the transmitted torque.

8. A hydraulic coupling comprising a cylindrical casing adapted to contain fluid; drive and driven elements disposed concentrically within the casing and operatively connected together by a gear pump variety power transmission mechanism embodying a gear, a plurality of spaced apart planetary pinions meshing with the gear and a rotary carrier provided with pinion retaining cavities and having inlet ducts for the fluid between the casing interior and the suction sides of the pinions and outlet ducts for the fluid between the pressure sides of the pinions and the casing interior; valve means adapted to control the outlet ducts; and mechanism operative automatically during operation of the coupling to actuate the valve means so as to maintain a substantially constant transmitted torque so far as the driven element is concerned, and embodying a slidably mounted piston disposed in the casing and operatively connected to the valve means, means forming a bleed duct between one of the outlet ducts and one side of the piston whereby the piston is subjected to variations in the static pressure of the fluid in said one outlet duct, and means for subjecting the piston to a substantially constant force in opposition to the pressure against the piston resulting from the bleed duct, said last mentioned means being adjustable while the coupling is in operation in order to vary the force against the piston and resultantly varying the substantially constant transmitted torque.

GEORGE E. BOCK.